United States Patent Office 3,161,382
Patented Dec. 15, 1964

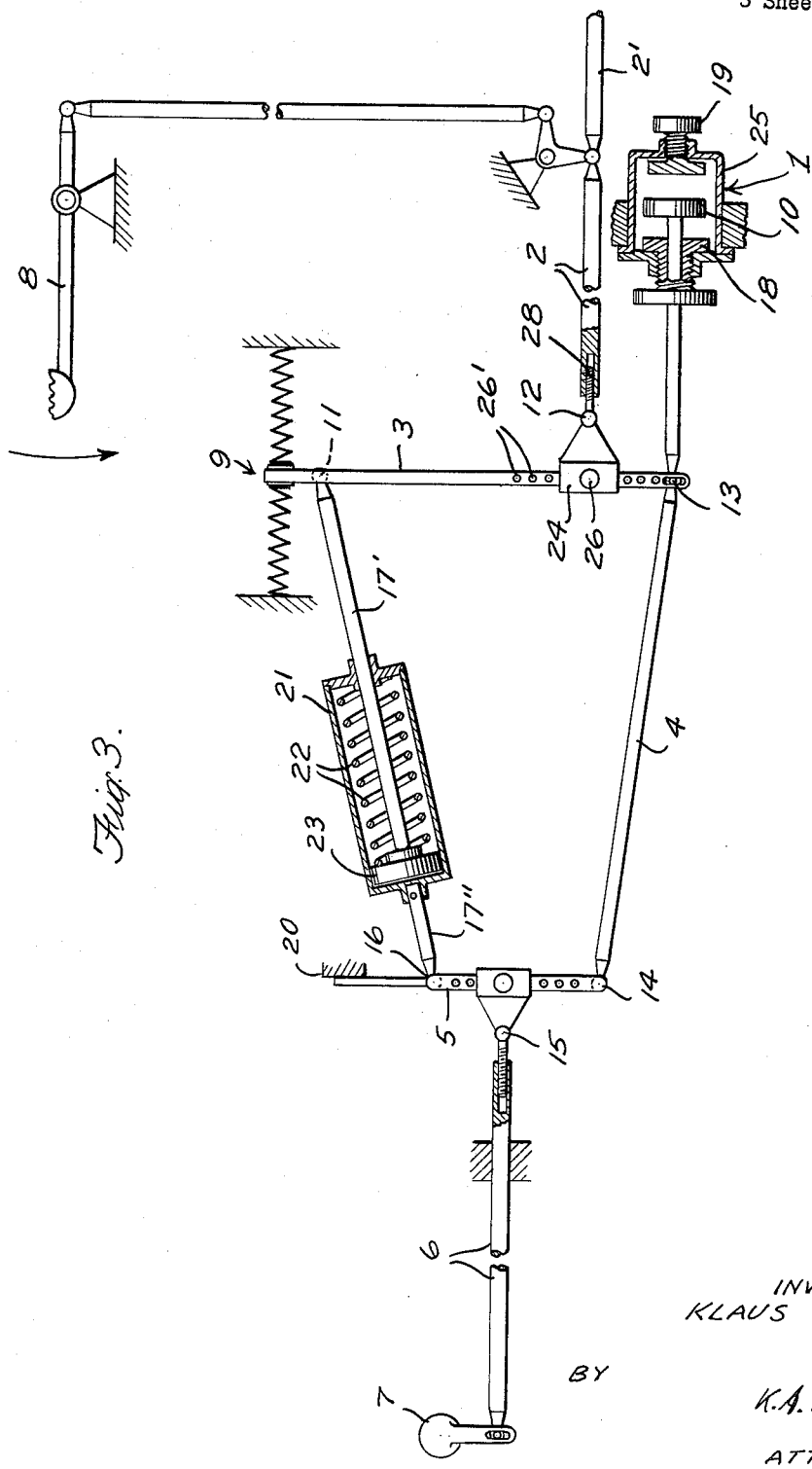

3,161,382
ATTITUDE CONTROL OF V.T.O.L. AIRCRAFT
Klaus Pfaff, Meersburg, Germany, assignor to Dornier-Werke G.m.b.H., Friedrichshafen, Germany, a firm
Filed Oct. 28, 1963, Ser. No. 319,442
Claims priority, application Germany, Nov. 3, 1962,
D 40,186
10 Claims. (Cl. 244—75)

The invention relates to an attitude control system for V.T.O.L. aircraft, more particularly to a control system automatically switching from normal control to control required upon partial failure of the engines producing vertical thrust.

Aircraft suitable for vertical start and landing are provided with two control systems: One system for aerodynamic control and one system for jet control of the attitude of the aircraft. Jet control is required during vertical take-off and landing and when the aircraft is hovering, i.e. when the forward speed of the aircraft is too low for aerodynamic control only. In this case the jet control must be used additionally or exclusively in order to effect certain control operations, such as yawing, etc., and in order to compensate moments caused by gusts, unsymmetric load and by other circumstances. For the attitude control by jet control nozzles are placed in the wings and in the fuselage of the aircraft. It is also conventional to use the thrust nozzles of the vertical thrust engines for controlling the attitude of the aircraft, either for supplementing the effect of the control jets or for partly or entirely replacing the control jet nozzles. The engines for producing vertical thrust are usually placed symmetrically with respect to the center of gravity of the aircraft. The resulting symmetrical arrangement of the thrust jet nozzles produces a moment-free resultant of the thrust components during hovering if the engines function satisfactorily. This is not so when the operation of one or more of the engines is unsatisfactory and there is a one-sided decrease of power or even entire failure of an engine. In this case the resultant of the thrusts does not extend through the center of gravity of the aircraft which is accompanied by considerable moments around the axis of the aircraft which moments cannot be compensated by a control system designed for normal operation of the thrust-producing engines and special control and stabilizing means must be provided to maintain the desired attitude of the aircraft.

Systems are known having additional control motors which go into action at excessive moments causing rotation of the aircraft around its longitudinal axis and which cause a change of the thrust or lift produced by the vertical thrust engines until the moments are compensated. Thereafter the attitude of the aircraft is controlled by the control means provided for normal operation of the thrust-producing engines. These conventional systems require additional apparatus, such as motors, amplifiers, electric conduits and other additional means for compensating undesired moments which apparatus require space and increase the weight of the aircraft.

It is an object of the present invention to provide a system for controlling the attitude of a V.T.O.L. aircraft during normal operation of the vertical thrust or lift-producing engines as well as upon asymmetric thrust production or failure of part of the thrust-producing engines, the system requiring no additional motors or other voluminous and weighty apparatus. The system according to the invention comprises a simple mechanism which is actuated by the conventional control stick and connected to the vertical thrust-producing engines for controlling the output of or lift produced by the engines on one side and on the opposite side of the longitudinal axis of the aircraft in the opposite sense. This mechanism comprises means for transmitting relatively small movements of the control stick to effect small changes of the relative outputs of the engines at normal operation of the engines and means for transmitting relatively small movements of the control stick to effect great changes of the relative output of or lift produced by the engines upon unequal thrust production or failure of some of the engines. The aforesaid means include members common to both means. Switching from one of said transmission means to the second transmission means takes place automatically when a gentle movement of the control stick fails to maintain the desired attitude of the aircraft and the control stick is more forcefully actuated.

The mechanism for transmitting the movements of the control stick to devices controlling the attitude of the aircraft when hovering or slowly moving horizontally comprises two control tracks, one of which serves for fine adjustment of said devices and the second serves for rough adjustment of said devices. The range of action of the fine adjusting track is limited and adjustable and the rough adjusting track is blocked when the fine adjusting track is in operation. When conditions of the vertical thrust-producing engines require actuation of the fine adjusting track beyond its predetermined range, the rough adjusting track is automatically unblocked and the fine adjusting track is blocked. The output change of or lift produced by the vertical thrust producing engines is effected by manipulation of the control stick. The position of the gas control handle is not affected by this control and remains unchanged.

The fine adjusting track is in operation when the attitude of the aircraft is substantially normal and not substantially disturbed. In this case the pilot can effect relatively small output changes of the vertical thrust-producing nozzles which are used for attitude control and can effect relatively small attitude control movements. The rough adjusting track is in operation when the attitude of the aircraft is considerably disturbed. In this case a relatively small movement of the control stick beyond a predetermined, adjustable position effects a relatively great output change of the vertical thrust-producing nozzles which are used for attitude control and effects relatively great attitude control movements. When operating within the first control range, i.e. when using the fine adjusting track of the transmission according to the invention, the control is very sensitive and the pilot can effect a very accurate control. When operating in the second range the pilot can quickly counteract great turning moments by using the rough adjusting track and can remove their causes, for example uncompensated moments. As stated before, the extent of the first, fine adjusting range, is adjustable by adjustment of its limits.

The control system according to the invention can be implemented in many ways. Electrical, hydraulic, or simple mechanical devices may be used. The example illustrated and described below is based on an arrangement wherein the thrust-producing engines which are also used for attitude control are placed symmetrically with respect to the longitudinal axis of the aircraft and are placed, for example in nacelles mounted on the wings, for example at the ends thereof, and the control system according to the invention is implemented by a simple lever mechanism. Two or more thrust-producing engines are usually placed for the sake of safety in each nacelle. If one of the engines fails partly or fully, the other engine or engines in the nacelle must produce more thrust to compensate the missing thrust as much as possible. The engines in the other nacelle are simultaneously throttled and used for moment compensation. The required output changes of the engines are initiated by manipulation of the control stick.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 3 is a diagrammatic illustration of a modified mechanism according to the invention.

In the several figures the lever systems are shown in a simplified manner and as applicable to the left side of the aircraft. The lever systems for the right side are not shown and are mirror-symmetric with respect to the systems on the left side of the aircraft. Like parts are designated by like numerals in the several figures.

Figure 1:
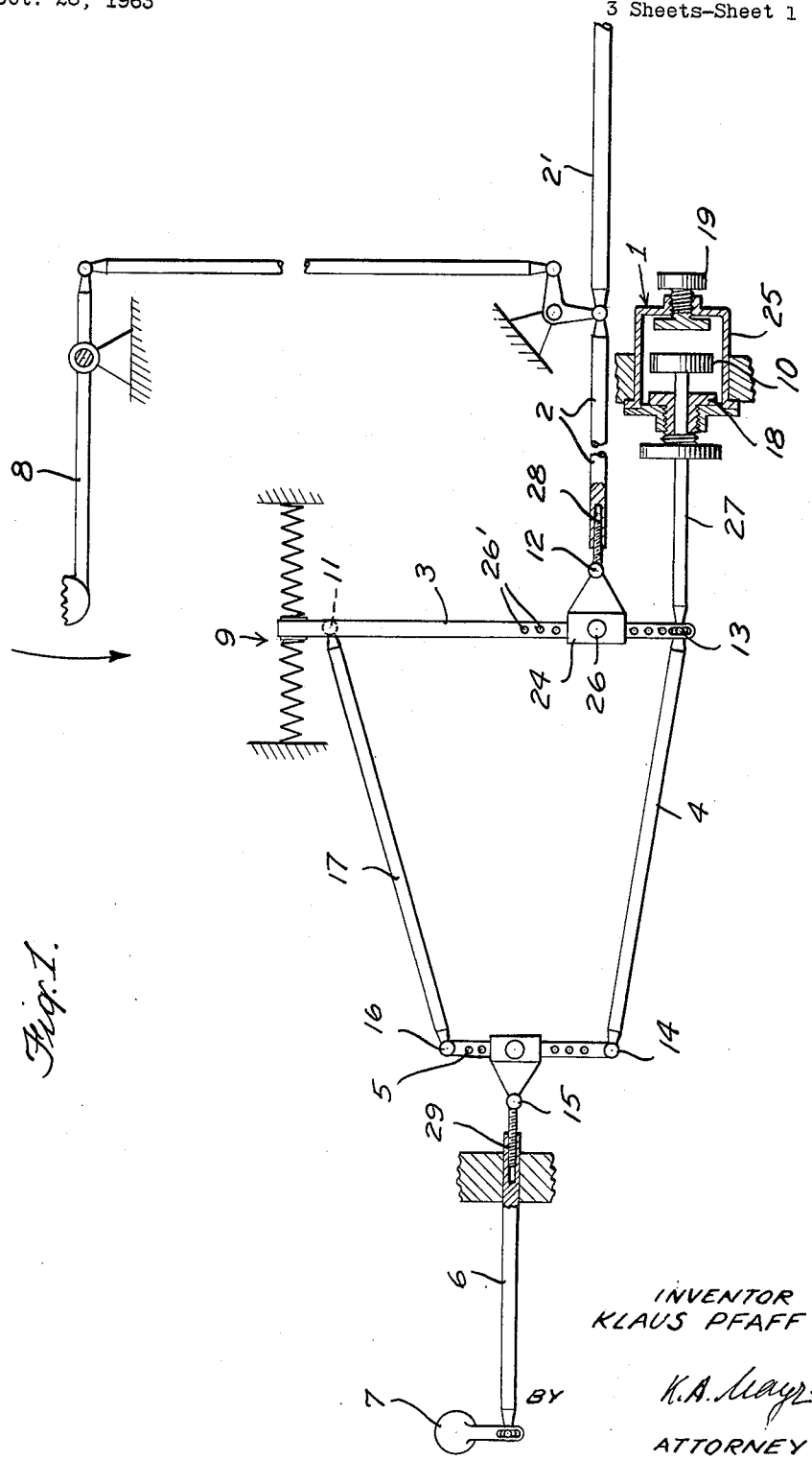
FIG. 1 is a diagrammatic illustration of a mechanism according to the invention.

Referring more particularly to FIG. 1 of the drawing, numeral 9 designates an energy-accumulating device formed by springs which hold fulcrums or joints 11 and 16 in a position for the first control range which effects fine adjustment. A control movement of a control stick 8, for example, in the direction of the arrow shown adjacent thereto in FIG. 1, is transmitted through a rod 2 to a lever 3 and through a rod 2' to a like lever of the mechanism for the right side of the aircraft, not shown. The left end of the rod 2 is pivotally connected to the lever 3 at 12. The lever 3 is swingable around a fulcrum formed by the joint 11 which is held stationary by the springs of the device 9. The movements of the lever 3 are transmitted through a rod or link 4 to a lever 5 swingable around a fulcrum 16 at the end of a rod or link 17 which is pivotally connected to the lever 3 at 11. The left end of rod 4 is pivotally connected at 14 to the free end of the lever 5. A rod or link 6 is pivotally connected at 15 to the lever 5 and is actuated thereby to operate a thrust-controlling device 7 which may be a fuel control valve for the respective thrust-producing engine, not shown.

Fine adjustment is effected by the mechanism shown in FIG. 1 because the position of the joints 11 and 16 is maintained by the energy-accumulating device 9.

The relation between the fine adjustment range and the rough adjustment range is defined by the locations of the fulcrums 12 and 15 on the levers 3 and 5. These locations can be adjusted. For this purpose the pivot 12 is mounted on a slide 24 on the lever 3 which is provided with a plurality of bores 26'. The position of the slide on the lever 3 can be adjusted and fixed by a bolt 26 extending through the slide 24 and a selected one of the bores 26'. The rod 2 is connected to the pivot 12 by means of a pin 28 which is axially screwed into the left end of the rod 2. A similar arrangement is provided for adjustably fixing the location of the pivot 15 on the lever 5.

For limiting the fine adjustment range a device 1 is provided. This device comprises a piston 10 reciprocating in a hollow cylinder 25. A rod 27 is connected to the piston 10 and has a free end pivotally connected at 13 to the free end of the lever 3. An abutment 18 is axially screwed into the left end wall of the cylinder 25 and an abutment 19 is axially screwed into the right end wall of the cylinder 25. The axial position of the abutments 18 and 19 is generally so adjusted that the piston 10 is in the middle between the abutments when the mechanism is in rest position. When the stick 8 is swung so far that the piston 10 abuts against one of the abutments 18 or 19 the pivots 13 and 14 become stationary and form fulcrums around which the levers 3 and 5 swing upon continued movement of the stick 8.

Let us assume that a thrust-producing engine at the left side of the aircraft fails and the fine control does not suffice for controlling the attitude of the aircraft. In this case the piston 10 abuts against the abutment 19. In the mechanism at the right side, which mechanism is mirror-symmetric to the mechanism on the left side, the piston 10 abuts against the abutment 18. Since the rolling moment is not compensated the pilot will use somewhat more force to continue movement of the stick 8 in the direction of the arrow. This increased force overcomes the action of the springs of the device 9. The rod 17 pivotally connected at 11 to the lever 3 and at 16 to the, now free, end of the lever 5 is moved to a much greater extent, due to the much greater length of the lever 3 between the pivots 11 and 12 than between the pivots 12 and 13, than the rod 4 was moved at a like extent of movement of the stick 8. This causes a quick increase of the thrust acting on one side of the aircraft and an equally quick decrease of the thrust acting on the opposite side of the aircraft.

Figure 2:
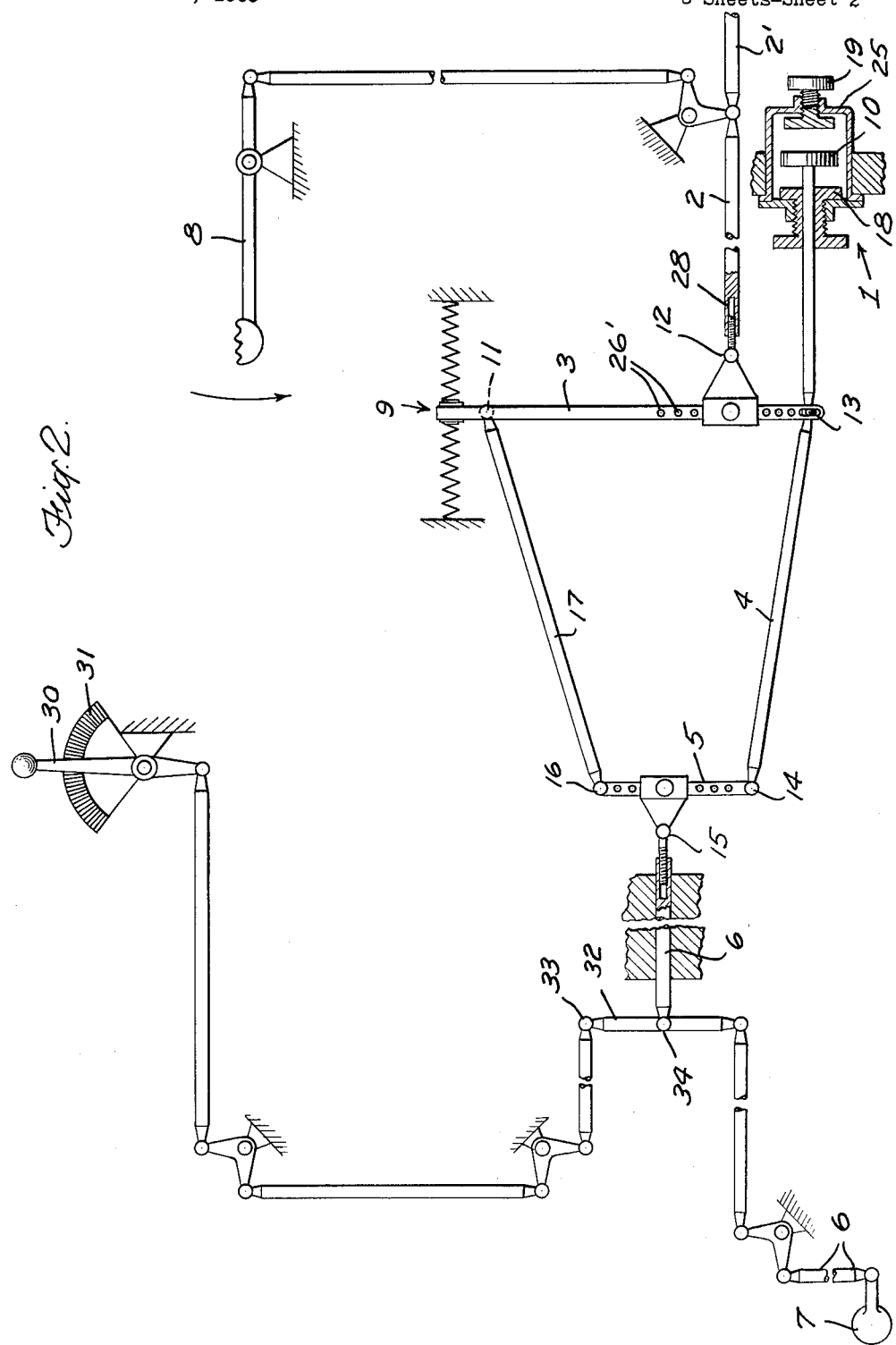
FIG. 2 is a diagrammatic illustration of an extension of the mechanism shown in FIG. 1.

FIG. 2 shows the combination of a gas control lever 30 with a mechanism as shown in FIG. 1. The rod 6 is not directly connected to the thrust control device 7 but is pivotally connected at 34 to a lever 32 which swings on the pivot 34. One end of the lever 32 is operatively connected to the fuel control device 7 for a thrust-producing engine and the other end 33 is pivotally connected to a linkage connected to the gas control lever 30. A detent device 31 is provided for locking the lever 30 in the desired positions. When the lever 30 is fixed in a desired position the end 33 of the lever 32 is stationary and forms a fulcrum around which the lever 32 swings upon actuation of the stick 8. When the lever 30 is actuated the lever 32 is swung on the pivot 34 whose position is determined by that of the stick 8. Actuation of stick 8 does not affect the position of the gas lever 30 since this lever is locked in the desired position. The illustrated arrangement affords control of the fuel supply to the thrust-producing engines for attitude control by manipulation of the control stick 8 only, without actuation of the gas control lever 30. With the system according to the invention the transition from fine control to rough control to cope with emergencies is rapid and automatic and does not require any additional action by the pilot.

FIG. 3 diagrammatically illustrates a modified mechanism according to the invention, including means for protecting the thrust or lift-producing engines against overloading. The abutments 18 and 19 are set for maximum output of the thrust-producing engines. If an engine on the left side of the aircraft fails and the piston 10 has reached the abutment 19 the mechanism is automatically set for rough control. As described in connection with FIG. 1, the fulcrum 13 is now stationary and the lever 3 is actuated by the control stick 8 against the action of the springs of the device 9. The thrust-producing engine or engines on the left side of the aircraft which are still in operation are already set for maximal output. The rough control must therefore become effective on the right side of the aircraft only and in a throttling sense. To prevent rough control on the left side of the aircraft an abutment 20 is provided which limits the movement of the lever 5 in the direction for increasing thrust. In order to prevent locking and to permit continued movement of the control stick 8 after exhaustion of the fine control, which continued movement is necessary for the thrust control on the right side of the aircraft, a device 21–23 is provided. The rod or link 17 of the mechanism shown in FIG. 1 is divided into two parts 17' and 17". One end of the rod 17' is provided with a piston 23 reciprocating in a hollow cylinder 21. One end of the rod 17" is connected to the cylinder 21. A spring 22 is placed in the cylinder between the piston 23 and the end of the cylinder through which the rod 17' extends. The spring 22 is so much pretensioned that the piston 23 abuts against the closed left end of the piston and the elements 17', 21, 17" form a rigid structure as long as the mechanism operates within the fine control range. Upon movement of the stick 8 beyond the fine control range the spring 22 is compressed and permits clockwise swinging of the lever 3 around the fulcrum 13.

Due to the mirror-symmetric arrangement of the mechanism at the right side of the aircraft, counterclockwise movement of the control stick 8 beyond the fine control range causes pressing of the piston 23 of the mechanism at the right side of the aircraft against the closed end of the cylinder 21 and swinging of the lever 5 to throttle fuel supply to the thrust-producing engines at the right side of the aircraft. If a thrust-producing engine fails at the right side of the aircraft, the mechanism at the right side operates in the aforedescribed manner of operation of the mechanism at the left side and the left mechanism operates in the aforedescribed manner of operation of the mechanism at the right side.

The abutment 20, the device 21–23 and the abutment 19, set for maximal output of the thrust-producing engines, prevent rough control of the thrust-producing engines which operate already at maximal output. In this case the rough control can have a throttling effect only on the thrust producing engines.

The aforedescribed examples relates to aircraft having jet engines. The control system according to the invention can equally well be applied to aircraft having propellers for producing lift.

I claim:

1. In combination with an aircraft having at least two lift-producing engines placed symmetrically with respect to the longitudinal axis of the aircraft:
a control system for controlling the attitude of the aircraft, comprising:
a control stick movable from an ineffective zero position through a first range effecting a fine control of the attitude of the aircraft and subsequently through a second range effecting a rough control of the attitude of the aircraft,
variable position control means for controlling the lifting effect of said engines, and
means operatively connecting said stick to said control means for changing the position of the latter in opposite directions upon manipulation of the former.
said connecting means including first means for transmitting movements of said control stick within said first range at a predetermined ratio to said control means for effecting relatively small changes of the position of said control means upon movement of said control stick within said first range,
said connecting means including second means for transmitting movements of said control stick within said second range at a different predetermined ratio to said control means for effecting relatively great changes of the position of said control means upon movement of said control stick within said second range.

2. The combination set forth in claim 1 including first means limiting the extent of movement of said first movement-transmitting means, and second means substantially preventing movement of said second movement-transmitting means when said first means permit movement of said first movement-transmitting means, said second means permitting movement of said second movement-transmitting means when said first means prevent movement of said first movement-transmitting means.

3. The combination set forth in claim 2 wherein said movement-limiting means is adjustable for adjusting the extent of movement of said first movement-transmitting means.

4. The combination set forth in claim 2 wherein the extent of movement of said first movement-transmitting means defined by said movement-limiting means corresponds to the movement of said variable position control means between zero and maximum lifting effect of the respective engine.

5. The combination set forth in claim 2 wherein said second movement-transmitting means include means preventing movement of said control means by said second movement-transmitting means in the direction for increasing the lifting effect of the respective engine when said lifting effect has reached a predetermined maximum.

6. In combination with an aircraft having at least two lift-producing engines placed symmetrically with respect to the longitudinal axis of the aircraft:
a control system for controlling the attitude of the aircraft during vertical take-off and landing and when the aircraft hovers, said system comprising:
a control stick movable from an ineffective zero position through a first range effecting a fine control of the attitude of the aircraft and subsequently through a second range effecting a rough control of the attitude of the aircraft,
variable position control means for varying the lifting effect of said engines, and
a mechanism operatively interconnecting said control stick and said control means for transmitting movements of the former to the latter,
said mechanism including first means capable of transmitting movements of said control stick within said first range at a predetermined ratio to said control means for effecting relatively small changes of the position of said control means,
said mechanism including second means capable of transmitting movements of said control stick within said second range at a different predetermined ratio to said control means for effecting relatively great changes of the position of said control means,
said first and second means having a common element,
yieldable means capable of holding said common element in position for transmitting movements of said control stick within said first range to said control means through said first movement-transmitting means, and
abutments limiting the movement of said common element for defining said first range of movableness of said control stick and affording movement of said common element against the action of said yieldable means for transmitting movements of said control stick within said second range to said control means through said second movement-transmitting means.

7. The combination defined in claim 6 wherein said abutments are adjustable for adjusting said first range of movableness of said control stick.

8. The combination defined in claim 6 wherein said second means includes an abutment limiting movement of said control means upon movement of said control stick for moving said control means in the direction for increasing the lifting effect of the respective engine.

9. The combination defined in claim 6 wherein said second means includes means preventing movement of said control means upon movement of said control stick for moving said control means in a direction for increasing the lifting effect of the respective engine, and means effecting movement of said control means upon movement of said control stick for moving said control means in the direction for decreasing the lifting effect of the respective engine.

10. The combination set forth in claim 6 wherein said mechanism includes means for varying said ratios.

References Cited by the Examiner
UNITED STATES PATENTS 3,049,880   8/62   Bracey et al. _____ 60—39.15

MILTON BUCHLER, *Primary Examiner.*

ANDREW H. FARRELL, *Examiner.*